United States Patent [19]

Hagiuda et al.

[11] 4,176,924
[45] Dec. 4, 1979

[54] SHUTTER RELEASE MECHANISM FOR CINECAMERA

[75] Inventors: Nobuyoshi Hagiuda, Kawasaki; Hiroaki Tanaka, Tokyo, both of Japan

[73] Assignee: Nippon Kogaku K.K., Tokyo, Japan

[21] Appl. No.: 843,324

[22] Filed: Oct. 18, 1977

[30] Foreign Application Priority Data

Oct. 29, 1976 [JP] Japan .......................... 51/145750[U]

[51] Int. Cl.² .............................................. G03B 1/00
[52] U.S. Cl. ................................................... 352/174
[58] Field of Search ...................... 352/174, 176, 177

[56] References Cited

U.S. PATENT DOCUMENTS

| | | | |
|---|---|---|---|
| 3,790,264 | 2/1974 | Heinrich | 352/174 |
| 4,006,978 | 2/1977 | Pustka | 352/174 |

Primary Examiner—Monroe H. Hayes
Attorney, Agent, or Firm—Gerald J. Ferguson, Jr.; Joseph J. Baker

[57] ABSTRACT

A control circuit for an electromagnetic shutter release mechanism for cinecamera controls a low level holding current at a predetermined constant level so that a shutter stopper which has been shifted in shutter operating position by an electromagnet energized by an initial high level actuating current is held in that position irrespective of a voltage variation of a D.C. power source.

6 Claims, 2 Drawing Figures

4,176,924

SHUTTER RELEASE MECHANISM FOR CINECAMERA

BACKGROUND OF THE INVENTION

This invention relates to a shutter release mechanism for cinecamera having an electromagnetically controlled shutter and, particularly, to an improvement on a shutter release mechanism having an electric circuit capable of controlling a current for energizing an electromagnet to drive a shutter-stopper.

DESCRIPTION OF THE PRIOR ART

In a cinecamera having a rotary sector member serving as a shutter element, an electromagnetic release device has been proposed in which an electromagnet is provided and a stopper to be controlled by the electromagnet is adapted to be held electromagnetically in a position permitting a rotation of the sector member, i.e., permitting a cinematographical shooting, when the shutter is released. In the electromagnetic release device, an amount of a current to be flown through a solenoid of the electromagnet is initially made large enough to produce a sufficient electromagnetic force to actuate the stopper and, then, reduced to a certain level enough to merely hold the stopper in that position for the purpose of economy. However, in the above prior shutter release mechanism, when a power source voltage is varied and, particularly, the power source voltage is reduced, the current supplied to the electromagnet is decreased. Accordingly, there is a possibility of an undesirable releasing of the stopper causing undesirable latching of the sector.

SUMMARY OF THE INVENTION

This invention purports to eliminate the aforementioned drawbacks of the conventional shutter release mechanism.

It is therefore an object of the present invention to provide a shutter release mechanism for cinecamera having a control circuit capable of supplying a constant current to the electromagnet for achieving a desirable operation of the electromagnet irrespective of variations of the D.C. power source voltage.

DETAILED DESCRIPTION OF THE PREFERRED EMBODIMENTS

Figure 1:
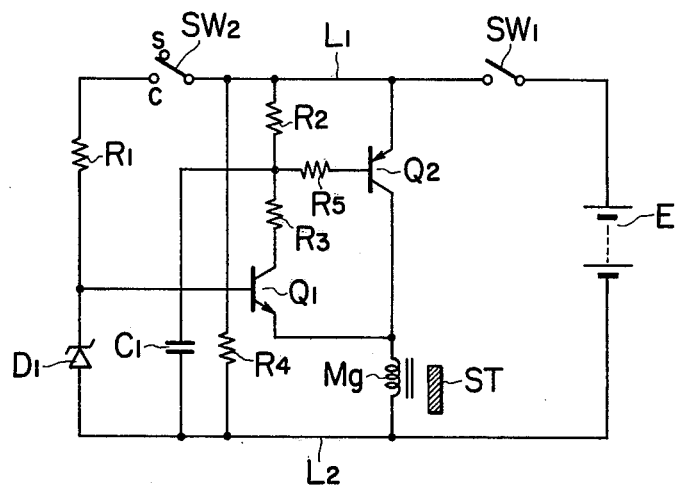
FIG. 1 is a circuit diagram of a control circuit in accordance with one embodiment of the present invention.

In FIG. 1 which shows an embodiment of the present invention, a release switch SW-1, a selection switch SW-2, a resistor R-1 and a Zener diode D-1 are connected in series with one contact of the release switch SW-1 and an anode of the Zener diode D-1 connected through power lines L-1 and L-2 to positive and negative terminals of a D.C. power source E respectively. The release switch SW-1 is ganged with a shutter release button (not shown) of a cinecamera so as to be closed when the shutter release button is depressed. The selection switch SW-2 is provided for switching the shooting mode of the cinecamera between the usual continuous shooting mode and the one-frame shooting mode. The selection switch SW-2 is closed for the continuous shooting mode and opened for the one-frame shooting mode.

A NPN-transistor Q-1 has a base connected to a junction between the resistor R-1 and the Zener diode D-1 and a collector connected through a series connection of a resistor R-2 and a resistor R-3 to the power line L-1. The transistor Q-1 has an emitter connected through an electromagnet Mg to the power line L-2.

A PNP-transistor Q-2 has a base connected through a resistor R-5 to a junction between the resistor R-2 and the resistor R-3 and a collector connected to the emitter of the transistor Q-1. The transistor Q-2 has an emitter connected to the power line L-1 between the release switch SW-1 and the selection switch SW-2. A capacitor C-1 is connected between the base of the transistor Q-2 and the power line L-2 connected to the negative terminal of the D.C. power source E and constitutes a time constant circuit with the series connection of the resistor R-2. A resistor R-4 is connected in parallel to the time constant circuit consisting of the series circuit of the resistor R-2 and the capacitor C-1 for the purpose of discharging the charge of the capacitor C-1. The resistor R-2 has a value sufficient to supply an initial base current to the transistor Q-2 enough to make the latter fully conductive.

In operation of the control circuit in FIG. 1, it is firstly assumed that the selection switch SW-2 is closed for the continuous shooting mode. At the moment when the release switch SW-1 is closed due to a depression of the shutter release button of the cinecamera, the transistor Q-2 is saturated and the capacitor C-1 begins to be charged through the resistor R-2. In this case, a saturation time of the transistor Q-2 is determined by a time constant of the series of the resistor R-2 and the capacitor C-1 so as to provide a sufficient period of time in which the electromagnet Mg can hold the stopper ST in the shutter release position. Upon the saturation of the transistor Q-2, a high level current flows through the emitter-collector circuit of the transistor Q-2 and energizes the electromagnet Mg so as to actuate the stopper ST which is of magnetic material and which is normally in a position in which the rotary sector is latched. As a result, the stopper ST is shifted from the shutter latching position to a shutter release position.

At this time, since an emitter voltage of the transistor Q-1 becomes approximately equal to a D.C. source voltage and a base voltage of the transistor Q-1 is constant and determined by the voltage appearing across the Zener diode D-1, the transistor Q-1 is in a cut-off state.

When the voltage across the capacitor C-1 is gradually increased, the base voltage of the transistor Q-2 is also increased. When the voltage across the capacitor C-1 reaches a predetermined value, the transistor Q-2 changes the state from the saturation state to an unsaturated conductive state.

Consequently, the initial actuating current flowing through the electromagnet Mg is decreased and gradually approaches to a holding value which is small but sufficient to hold the stopper ST in the shutter release position. To this end, the emitter voltage of the transistor Q-1, which is a product of a resistance component of a solenoid of the electromagnet Mg and the collector current of the transistor Q-2, is gradually reduced. When the emitter voltage of the transistor Q-1 becomes smaller than the difference between the constant voltage across the Zener diode D-1 and a base-to-emitter voltage $V_{BE}$ of the transistor Q-1, the transistor Q-1 turns on and controls the conduction of the transistor Q-2 in its unsaturated conductive state. The collector current of the transistor Q-2, in this case, is the holding current for holding the electromagnet Mg operative to maintain the stopper ST in the shutter release position.

Describing the operation of the control circuit when the D.C. voltage is varied, it is assumed that the collector current of the transistor Q-2 and hence, the emitter voltage of the transistor Q-1 is increased. Since the base voltage of the transistor Q-1 is fixed to the constant reference voltage determined by the Zener diode D-1, the collector current of the transistor Q-1 is thus decreased. Accordingly, the base voltage of the transistor Q-2 is increased and the collector current of the transistor Q-2 is decreased. Therefore, the current flowing through the electromagnet Mg is decreased.

Alternatively, when the emitter current of the transistor Q-1 is decreased, the collector voltage of the transistor Q-1 is increased. Therefore, the collector current of the transistor Q-2 is increased to increase the current flowing into the electromagnet Mg. Consequently, in accordance with the control circuit of the present invention, the current flowing through the electromagnet Mg can be held at constant during the closure of the release switch SW-1 irrespective of variations of the D.C. source voltage, so that there is no possibility that the electromagnet Mg undesirably release the latching of the stopper ST in the shutter release position with the release switch SW-1 closed.

In the one-frame shooting mode to be established by opening the selection switch SW-2, when the release switch SW-1 is closed, the transistor Q-2 turns on to the saturation state and supplies a large current to the electromagnet Mg to energize the latter to thereby make the stopper ST actuated. As a result, the stopper ST is shifted to the shutter release position. After the capacitor C-1 is charged to a predetermined voltage, the transistor Q-2 turns off. As a result, the holding current flowing through the electromagnet Mg is interupted and the electromagnet Mg is deenergized. Upon deenergization of the electromagnet Mg, the shutter stopper ST which has been in the shutter release position is released, so that the stopper ST prevents the sector from rotating.

Figure 2:
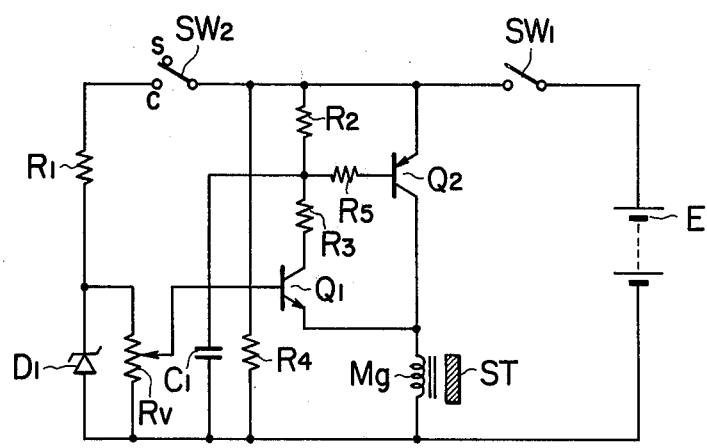
FIG. 2 is a circuit diagram of a control circuit in accordance with another embodiment of the present invention.

FIG. 2 shows another embodiment of the control circuit in accordance with the present invention which is similar to the embodiment in FIG. 1 except that in FIG. 2, a variable resistor RV is inserted between the Zener diode D-1 and the transistor Q-1. That is, the variable resistor RV is connected in parallel to the Zener diode D-1 and the slide terminal of the variable resistor RV is connected to the base of the transistor Q-1. By means of the above construction, the constant reference voltage can be determined by a combination of the Zener diode D-1 and the variable resistor RV. In other words, the voltage applied to the electromagnet Mg, when the transistor Q-1 is in the unsaturated conductive state is represented by the difference between the constant reference voltage across the Zener diode D-1 and the base-to-emitter voltage $V_{BE}$ of the transistor Q-1. Therefore, the holding current flowing through the electromagnet Mg can be determined by adjusting the value of the variable resistor RV.

In accordance with the present invention, the shutter release mechanism having the control circuit is obtained, wherein after the shutter stopper ST is shifted by the electromagnet Mg energized by the initial large current to its shutter release position to allow the sector to rotate, the holding current for holding the stopper ST in the shutter release position can be fixed to a predetermined constant value irrespective of variations of the D.C. source voltage. Namely, during the continuous shooting, there is no possibility that the electromagnet Mg undesirably releases the stopper ST due to the variations of the D.C. source voltage. Therefore, by utilizing the control circuit of the present invention, in the cinecamera, a satisfactory cinematograph can be attained.

What is claimed is:

1. A shutter release mechanism for a cinecamera having a shutter release button, a rotatable sector serving as a shutter for exposure of a film, a stopper for preventing the rotation of said sector, an electromagnet to be energized to selectively render said stopper operative and an electric circuit for supplying a current to said electromagnet when said shutter is released, said electric circuit comprising;
    (a) a D.C. power source circuit for supplying an electric power to said electromagnet;
    (b) a normally opened first switch means incorporated in said D.C. power source circuit and ganged with said release button to supply an electric power to said electromagnet when said release button is operated;
    (c) a first semiconductor element inserted in said D.C. power source circuit for controlling a current through said electromagnet;
    (d) a time constant circuit for allowing said first semiconductor element to flow a sufficient amount of said current to actuate said stopper from shutter latching position to shutter release position during a predetermined period of time after said first switch means closed; and
    (e) control means responsive to a reduction of said current through said first semiconductor element to a predetermined value sufficient to hold said actuation of said stopper after said predetermined period of time for holding said predetermined current value wherein said control means comprises;
        (a) a constant voltage means; and
        (b) a second semiconductor element for controlling said first semiconductor element so that the difference between said constant voltage and the voltage across said electromagnet is constant to thereby maintain said current through said second semiconductor element and said electromagnet substantially at said predetermined value in spite of variations in said D.C. power source circuit.

2. A shutter release mechanism as claimed in claim 1, wherein said first semiconductor element is a first transistor having a collector connected to said electromagnet, an emitter connected to said D.C. voltage source and a base connected to said time constant circuit.

3. A shutter release mechanism as claimed in claim 2, wherein said second semiconductor element is a second transistor having a collector connected to the base of said first transistor, an emitter connected to said electromagnet and a base connected to said constant voltage means.

4. A shutter release mechanism as claimed in claim 1, wherein said constant voltage means is a constant voltage element connected in parallel with said D.C. voltage source.

5. A shutter release mechanism as claimed in claim 1, wherein said constant voltage means comprises a constant voltage element connected in parallel with said D.C. voltage source and a variable resistor connected in parallel to said circuit element, whereby the constant voltage is regulatable by regulating said variable resistor.

6. A shutter release mechanism as claimed in claim 1, further comprising a second switch means for making said control means inoperative selectively.

* * * * *